(12) United States Patent
Stilgenbauer et al.

(10) Patent No.: US 9,664,064 B2
(45) Date of Patent: May 30, 2017

(54) EXHAUST-GAS TURBOCHARGER

(75) Inventors: Michael Stilgenbauer, Bolanden (DE); Nico Kanoffsky, Bolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 637 days.

(21) Appl. No.: 14/235,545

(22) PCT Filed: Jul. 24, 2012

(86) PCT No.: PCT/US2012/047952
§ 371 (c)(1),
(2), (4) Date: Jan. 28, 2014

(87) PCT Pub. No.: WO2013/022598
PCT Pub. Date: Feb. 14, 2013

(65) Prior Publication Data
US 2014/0169946 A1    Jun. 19, 2014

(30) Foreign Application Priority Data
Aug. 8, 2011    (DE) .......... 10 2011 109 742

(51) Int. Cl.
| F01D 25/18 | (2006.01) |
| F01D 17/10 | (2006.01) |
| F02B 37/18 | (2006.01) |
| F02B 37/24 | (2006.01) |

(52) U.S. Cl.
CPC ............ *F01D 25/18* (2013.01); *F01D 17/10* (2013.01); *F02B 37/183* (2013.01); *F02B 37/24* (2013.01); *Y02T 10/144* (2013.01)

(58) Field of Classification Search
CPC ........ F01D 17/10; F01D 25/18; F02B 37/183; Y02T 10/144
See application file for complete search history.

(56) References Cited

U.S. PATENT DOCUMENTS

| 4,581,953 A | 4/1986 | Walston et al. |
| 4,719,757 A * | 1/1988 | Nakazawa ............. F01D 17/18 29/889.22 |

(Continued)

FOREIGN PATENT DOCUMENTS

| DE | 102008053079 A1 | 4/2010 |
| JP | 07-180719 A | 7/1995 |
| WO | 97-16653 A1 | 5/1997 |

OTHER PUBLICATIONS

International Search Report PCT/US2012/047952, Dec. 6, 2012.

*Primary Examiner* — Igor Kershteyn
(74) *Attorney, Agent, or Firm* — Eric L. Doyle; Stephan A. Pendorf; Patent Central LLC

(57) ABSTRACT

An exhaust-gas turbocharger (1) having a turbine (2) which is provided with a variable turbine geometry (18) and/or a wastegate; and having an actuator (11) which is connected to the variable turbine geometry (18) and/or the wastegate via a coupling rod (14). The coupling rod (14) is connected at its end regions (21, 22) at one side to a pin of the actuator (11) by means of a lock washer (25) and at the other side to a pin (33) of an adjusting shaft (5) of the variable turbine geometry (18) and/or of the wastegate by means of a lock washer (26). The lock washers (25, 26) are integrated in the coupling rod (14).

20 Claims, 3 Drawing Sheets

(56) References Cited

U.S. PATENT DOCUMENTS

| | | | | |
|---|---|---|---|---|
| 4,893,474 A * | 1/1990 | Miller | ................... | F02B 37/18 |
| | | | | 60/602 |
| 4,947,704 A * | 8/1990 | Gokee | ..................... | F16C 1/14 |
| | | | | 403/141 |
| 5,746,058 A * | 5/1998 | Vertanen | ............... | F15B 15/10 |
| | | | | 248/299.1 |
| 5,829,906 A | 11/1998 | Gabas Cebollero | | |
| 6,155,048 A * | 12/2000 | Vertanen | ............ | F02B 37/183 |
| | | | | 251/61.4 |
| 6,883,317 B2 * | 4/2005 | Heath | ................ | F02B 37/186 |
| | | | | 137/527 |
| 7,340,895 B2 * | 3/2008 | Noelle | ................. | F02B 37/24 |
| | | | | 251/123 |
| 7,926,334 B2 * | 4/2011 | Severin | ............... | F01D 17/165 |
| | | | | 73/114.77 |

\* cited by examiner

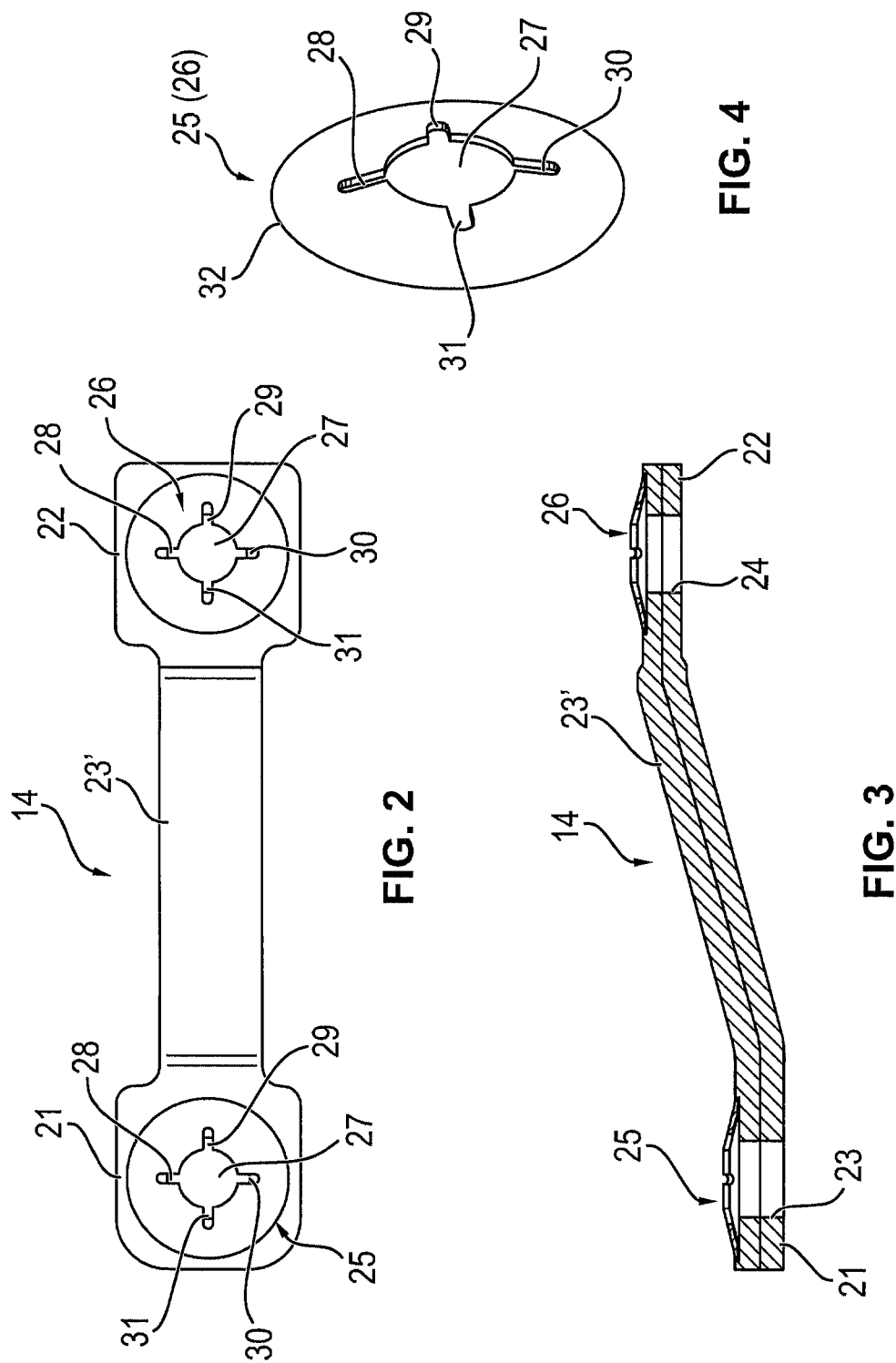

EXHAUST-GAS TURBOCHARGER

BACKGROUND OF THE INVENTION

Field of the Invention

The invention relates to an exhaust-gas turbocharger.

Description of the Related Art

An exhaust-gas turbocharger of said type is known from DE 10 2008 053 079 A1. In said known design, a coupling rod connects the actuator (for example an electric actuator or a pneumatic control capsule) to the assembly of an adjusting shaft of a variable turbine geometry (VTG), also referred to as a guide grate. Here, the coupling rod transmits the movement generated by the actuator to the VTG. Instead of a VTG or in addition to the VTG, the use of a coupling rod is also possible in the case of an exhaust-gas turbocharger with a wastegate, which constitutes a turbine bypass. Here, the coupling rod is mounted on a pin assigned to the actuator and on a pin assigned to the adjusting shaft and is secured by means of a lock washer. The known lock washers have the disadvantage, however, that as a result of the difficult mounting process, the clipping thereof to the pin diameter cannot be ensured in a reliable manner in terms of a process.

It is therefore an object of the present invention to provide an exhaust-gas turbocharger which permits simpler mounting of its coupling rod between the actuator and variable turbine geometry (VTG) and/or wastegate.

BRIEF SUMMARY OF THE INVENTION

By virtue of the fact that the lock washers at the two ends of the coupling rod are components which are integrated in the coupling rod, the invention makes it possible during assembly for the coupling rod together with the integrated lock washers to be mounted in one working step.

The subclaims relate to advantageous refinements of the invention.

The invention further concerns a coupling rod as an object that can be marketed independently.

BRIEF DESCRIPTION OF THE SEVERAL VIEWS OF THE DRAWINGS

Further details, features and advantages of the invention will emerge from the following description of an exemplary embodiment on the basis of the drawing, in which:

FIG. 2 shows a plan view of a coupling rod according to the invention, FIG. 3 shows a longitudinal section through the coupling rod according to the invention, FIG. 4 shows a perspective illustration of a lock washer and, FIG. 5 shows an end region of the coupling rod according to the invention when mounted on a pin.

DETAILED DESCRIPTION OF THE INVENTION

Figure 1:
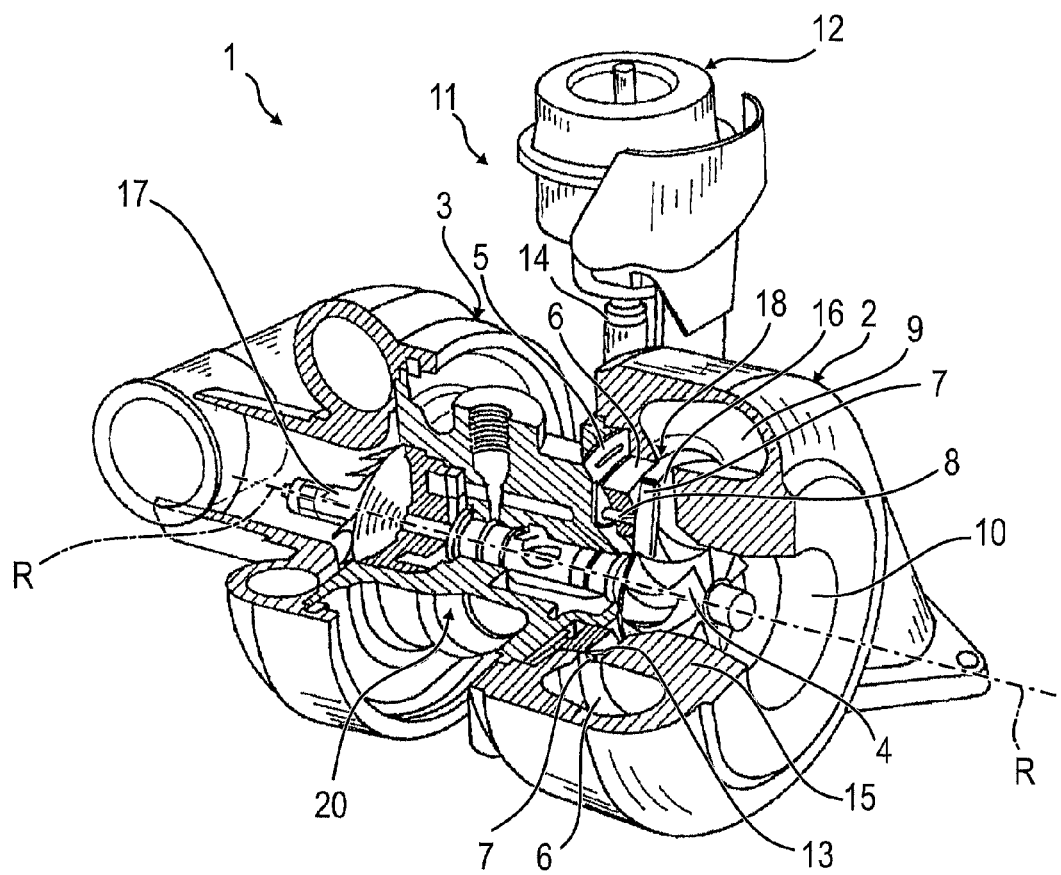
FIG. 1 shows a perspective, partially sectional illustration of an exhaust-gas turbocharger according to the invention.

FIG. 1 shows a perspective view, illustrated partially in section, of a turbocharger according to the invention. The turbocharger 1 has a turbine housing 2 and has a compressor housing 3 which is connected to said turbine housing via a bearing housing 20. The housings 2, 3 and 20 are arranged along an axis of rotation R. The turbine housing 2 is shown partially in section in order to illustrate the arrangement of a blade bearing ring 6 and a radially outer guide grate formed by said blade bearing ring, or a variable turbine geometry 18, which has a multiplicity of adjustable blades 7 which are distributed about the circumference and which have rotary shafts 8. In this way, nozzle cross sections are formed which, depending on the position of the adjustable blades 7, are larger or smaller and supply a greater or lesser amount of the exhaust gas of an engine, which is supplied via a supply duct 9 and discharged via a central connecting piece 10, to the turbine wheel 4 which is situated in the center on the axis of rotation R, in order, by means of the turbine wheel 4, to drive a compressor wheel 17 which is seated on the same shaft.

To control the movement or the position of the adjustable blades 7, an actuating device or an actuator 11 is provided which may for example be in the form of an electric actuator or pneumatic control capsule. In the embodiment illustrated, the actuating device 11 has a control housing 12 and a coupling rod 14 in order to transmit the movement thereof to an adjusting ring 5 situated behind the blade bearing ring 6, said movement being converted into a slight rotational movement of said adjusting ring. Between the blade bearing ring 6 and an annular part 15 of the turbine housing 2 there is formed a free space 13 for the adjustable blades 7. To be able to safeguard said free space 13, the blade bearing ring 6 has spacers 16. The free space for the adjustable blades 7 is delimited in the upward direction above the spacers 16 by a receiving disk 19.

The coupling rod 14 which is only partially visible in FIG. 1 is illustrated in detail in FIGS. 2 and 3. As is clear when viewing FIGS. 2 and 3 together, the coupling rod 14 has two end regions 21 and 22 which are connected to one another via an elongate connecting region 23. Here, FIG. 2 shows that the end regions 21 and 22 are of greater width than the central or connecting region 23.

The end regions 21 and 22 are each provided with passage recesses 23 and 24 respectively.

As shown in particular in FIG. 3, said passage recesses 23 and 24 are spanned by in each case one lock washer 25 and 26. Here, the lock washers 25 and 26 are embedded into the material of the coupling rod 14 or the end regions 21 and 22 thereof. If the coupling rod 14 is a plastic rod, the lock washers 25 and 26 are encapsulated at their edge regions by the plastic material, and thereby integrated into the coupling rod 14, during the course of the injection molding of the plastic rod.

If the coupling rod 14 is a metal rod, the integration of the lock washers 25 and 26 may be realized by caulking or welding of the edge regions.

As can also be seen from FIG. 3, in the particularly preferred embodiment illustrated, the coupling rod 14 is of cranked design. That is to say, the end region 21 and also the end region 22 are arranged at an angle, which is an obtuse angle in the example, with respect to the connecting region 23, as can be seen in detail from the diagrammatic illustration of FIG. 3.

FIG. 4 shows the design of the lock washers 25 and 26. As shown in FIG. 4, the lock washers 25, 26 are of circular design, and as shown in FIG. 3, are of domed design, such that they are of similar form to a plate spring. The lock washers 25 and 26 have in each case a central through opening 27 which, in the assembled state of FIGS. 2 and 3, is aligned with the passage recesses 23 and 24.

Furthermore, the particularly preferred embodiments of the lock washers 25 and 26 as per FIG. 4 have four slots 28, 29, 30 and 31 which extend from the through opening 27 in the direction of an outer edge 32 of the lock washer 25, 26, and which are arranged in each case at uniform angular intervals with respect to one another. In the particularly preferred embodiment illustrated in FIG. 4, the angular interval is in each case 90°.

Figure 5:
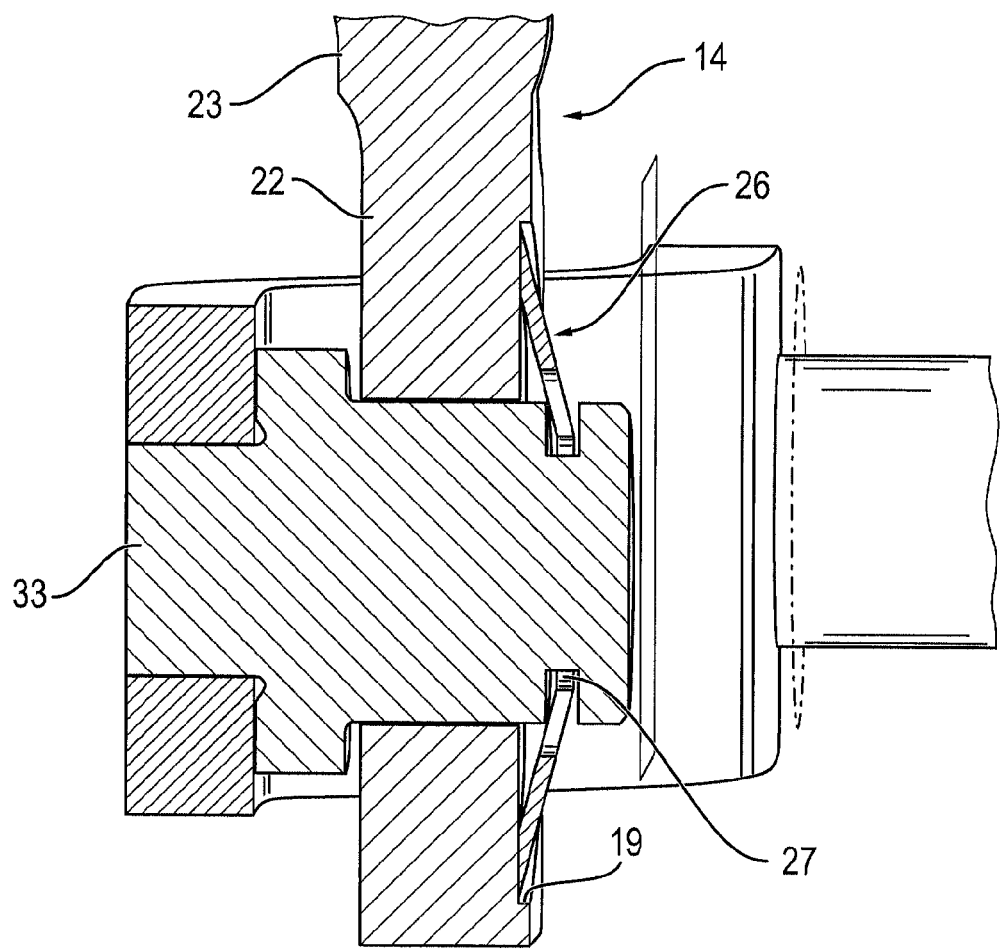

FIG. 5 shows the assembled state of the coupling rod 14, wherein the end region 22 with its associated lock washer 26 is illustrated here by way of example. Said illustration is representative of the other end region 21 with its lock washer 25.

In the mounted state illustrated in FIG. 5, a pin 23 extends through the through opening 27 in the lock washer 26, wherein the pin 23 may be either that of the actuator 11 or that of the adjusting shaft of the VTG 18. Owing to the integration of the lock washer 26 in the material of the coupling rod 14 or the end region 22 thereof, the mounting of the pin 33 may take place in one working step, wherein FIG. 5 also shows that the lock washer 26 is embedded in a depression 19 of the end region 22.

In addition to the above written disclosure of the invention, reference is hereby explicitly made to the diagrammatic disclosure thereof in FIGS. 1 to 5.

LIST OF REFERENCE SYMBOLS

1 Exhaust-gas turbocharger
2 Turbine housing
3 Compressor housing
4 Turbine wheel
5 Adjusting ring
6 Blade bearing ring
7 Adjustable blades
8 Rotary shafts
9 Supply duct
10 Axial connecting piece
11 Actuating device/Actuator
12 Control housing
13 Free space for guide blades 7
14 Coupling rod
15 Annular part of the turbine housing 2
16 Spacer/Spacer cam
17 Compressor wheel
18 Variable turbine geometry VTG/Guide grate
19 Depression
20 Bearing housing
21, 22 End regions
23, 24 Passage recesses
23' Connecting region
25, 26 Lock washers
27 Through opening
28, 29, 30, 31 Slots
32 Edge region/Outer edge
33 Pin
R Axis of rotation

The invention claimed is:

1. An exhaust-gas turbocharger (1) having
a turbine (2) which is provided with a variable turbine geometry (18) and/or a wastegate; and
an actuator (11) which is connected to the variable turbine geometry (18) and/or the wastegate via a coupling rod (14),
wherein the coupling rod (14) is connected at its end regions (21, 22) at one side to a pin of the actuator (11) by means of internal-tooth, quick-lock, spring retention lock washer (25) and at the other side to a pin (33) of an adjusting shaft (5) of the variable turbine geometry (18) and/or of the wastegate by means of internal-tooth, quick-lock, spring retention lock washer (26), and wherein the internal-tooth, quick-lock, spring retention lock washers (25, 26) are integrated in the coupling rod (14).

2. The exhaust-gas turbocharger as claimed in claim 1, wherein the material of the coupling rod (14) is plastic.

3. The exhaust-gas turbocharger as claimed in claim 2, wherein the internal-tooth, quick-lock, spring retention lock washers (25, 26) are cast at the edges into the plastic material of the coupling rod (14) by encapsulation.

4. The exhaust-gas turbocharger as claimed in claim 1, wherein the material of the coupling rod (14) is metal.

5. The exhaust-gas turbocharger as claimed in claim 4, wherein the internal-tooth, quick-lock, spring retention lock washers (25, 26) are caulked with the coupling rod (14).

6. The exhaust-gas turbocharger as claimed in claim 4, wherein the internal-tooth, quick-lock, spring retention lock washers (25, 26) are welded to the coupling rod (14).

7. The exhaust-gas turbocharger as claimed in claim 1, wherein the internal-tooth, quick-lock, spring retention lock washers (25, 26) are circular.

8. The exhaust-gas turbocharger as claimed in claim 1, wherein the internal-tooth, quick-lock, spring retention lock washers (25, 26) are of domed form.

9. The exhaust-gas turbocharger as claimed in claim 1, wherein the internal-tooth, quick-lock, spring retention lock washers (25, 26) each have a central through opening (27).

10. The exhaust-gas turbocharger as claimed in claim 9, wherein four slots (28 to 31) extend from the through opening (27) in the direction of an outer edge (32) of the internal-tooth, quick-lock, spring retention lock washers (25, 26).

11. The exhaust-gas turbocharger as claimed in claim 2, wherein the internal-tooth, quick-lock, spring retention lock washers (25, 26) are cast at the edges into the plastic material of the coupling rod (14) by encapsulation.

12. The exhaust-gas turbocharger as claimed in claim 1, wherein the material of the coupling rod (14) is metal.

13. The exhaust-gas turbocharger as claimed in claim 4, wherein the internal-tooth, quick-lock, spring retention lock washers (25, 26) are caulked with the coupling rod (14).

14. The exhaust-gas turbocharger as claimed in claim 4, wherein the internal-tooth, quick-lock, spring retention lock washers (25, 26) are welded to the coupling rod (14).

15. A coupling rod (14) of an exhaust-gas turbocharger (1), having two end regions (21, 22) which are spaced apart from one another and which are connected to one another via an elongate connecting region (23'), wherein an internal-tooth, quick-lock, spring retention lock washer (25, 26) is integrated in each end region (21, 22).

16. The coupling rod as claimed in claim 15, wherein the material of the coupling rod (14) is plastic.

17. The exhaust-gas turbocharger as claimed in claim 15, wherein the internal-tooth, quick-lock, spring retention lock washers (25, 26) are circular.

18. The exhaust-gas turbocharger as claimed in claim 15, wherein the internal-tooth, quick-lock, spring retention lock washers (25, 26) are of domed form.

19. The exhaust-gas turbocharger as claimed in claim 15, wherein the internal-tooth, quick-lock, spring retention lock washers (25, 26) each have a central through opening (27).

20. The exhaust-gas turbocharger as claimed in claim 19, wherein four slots (28 to 31) extend from the through opening (27) in the direction of an outer edge (32) of the internal-tooth, quick-lock, spring retention lock washers (25, 26).

* * * * *